(12) United States Patent
Otaka

(10) Patent No.: US 11,039,087 B2
(45) Date of Patent: Jun. 15, 2021

(54) IMAGE PROCESSING APPARATUS AND COMPUTER-READABLE STORAGE MEDIUM

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/507,072

(22) Filed: Jul. 10, 2019

(65) Prior Publication Data
US 2020/0021751 A1   Jan. 16, 2020

(30) Foreign Application Priority Data

Jul. 10, 2018   (JP) .............. JP2018-130439

(51) Int. Cl.
| | |
|---|---|
| *H04N 5/00* | (2011.01) |
| *H04N 5/272* | (2006.01) |
| *G06K 9/00* | (2006.01) |
| *G06F 16/29* | (2019.01) |
| *G06F 16/51* | (2019.01) |
| *G06F 16/54* | (2019.01) |
| *B60R 1/00* | (2006.01) |

(52) U.S. Cl.
CPC .............. *H04N 5/272* (2013.01); *G06F 16/29* (2019.01); *G06F 16/51* (2019.01); *G06F 16/54* (2019.01); *G06K 9/00798* (2013.01); *B60R 1/00* (2013.01); *B60R 2300/304* (2013.01)

(58) Field of Classification Search
CPC ............. H04N 5/00; G06F 16/00; G06K 9/00
See application file for complete search history.

(56) References Cited

U.S. PATENT DOCUMENTS

| | | | |
|---|---|---|---|
| 2017/0011270 A1* | 1/2017 | Kamada | ................. G01C 21/20 |
| 2019/0172349 A1* | 6/2019 | Vora | ................. G08G 1/096833 |

FOREIGN PATENT DOCUMENTS

| | | |
|---|---|---|
| JP | 2014170378 A | 9/2014 |
| JP | 2015177442 A | 10/2015 |

* cited by examiner

*Primary Examiner* — Maryam A Nasri

(57) ABSTRACT

An image processing apparatus is provided, the image processing apparatus including: a vehicle image information acquiring unit that acquires vehicle image information including at least one captured image captured by a vehicle, and an image-capturing position of the captured image; a road image acquiring unit that acquires at least one road image corresponding to the image-capturing position from a plurality of road images captured by a vehicle; and a superimposed image generating unit that generates a superimposed image in which the road image is superimposed on the captured image.

17 Claims, 9 Drawing Sheets

IMAGE PROCESSING APPARATUS AND COMPUTER-READABLE STORAGE MEDIUM

The contents of the following Japanese patent application are incorporated herein by reference: 2018-130439 filed in JP on Jul. 10, 2018

BACKGROUND

1. Technical Field

The present invention relates to an image processing apparatus, and a computer-readable storage medium.

2. Related Art

There are known techniques to: store, in advance, aerial photographs of roads that are captured from the air; read out an aerial photograph of a road in front of a vehicle; detect white lines; convert an image of the white lines into an image as seen from the viewpoint of a driver of the vehicle; and send the image to the vehicle (see Patent Literature 1, for example).

PRIOR ART LITERATURE

Patent Literature

[Patent Literature 1] Japanese Patent Application Publication No. 2014-170378

SUMMARY

It is desired to provide a technique that makes it possible to allow a driver to be aware of white line positions without preparing aerial photographs in situations where white lines cannot be or can hardly be visually recognized due to the influence of snow or rain.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
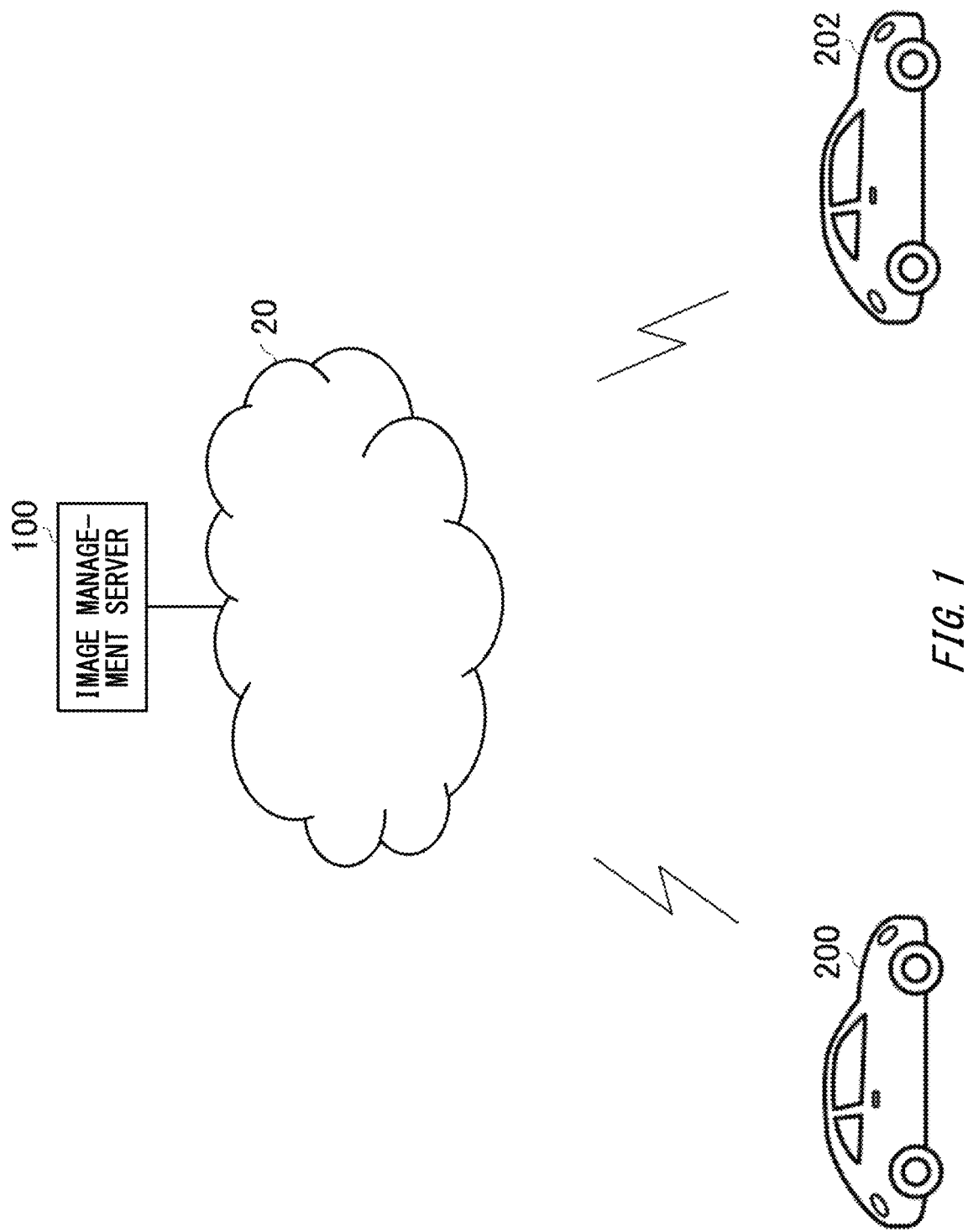
FIG. 1 schematically illustrates an exemplary communication environment of an image management server 100.

FIG. 1 schematically illustrates an exemplary communication environment of an image management server 100. The image management server 100 receives, from a vehicle 200 having an image-capturing unit via a network 20, a road image obtained by the vehicle 200 by capturing an image of a road, and manages the received image. The vehicle 200 sends, to the image management server 100, a road image captured while it is travelling on a road, and an image-capturing position and an image-capturing time, for example. The image-capturing time may indicate a time at which the image-capturing is performed or a date and time on and at which the image-capturing is performed. The road image may be a still image. In addition, the road image may be a moving image (motion image).

The network 20 may be any network. For example, the network 20 may include at least any one of the internet, a mobile phone network such as a so-called 3G (3rd Generation) network, LTE (Long Term Evolution) network, 4G (4th Generation) network, or 5G (5th Generation) network, a public wireless LAN (Local Area Network), and a leased network.

The image management server 100 stores the road image, and the image-capturing position and image-capturing time, in association with each other. The road image stored in the image management server 100 may be a road image captured when there is an unobstructed view of the road. For example, the road image stored in the image management server 100 is not an image of the road captured when it is raining or snowing, but is an image captured when it is sunny or cloudy. The image management server 100 may be configured to receive only a road image captured when there is an unobstructed view of the road. In addition, the image management server 100 may store only images captured when there is an unobstructed view of a road, by filtering received road images by performing image analysis on them, or by manually filtering received road images.

Upon being requested by the vehicle 200, the image management server 100 generates a superimposed image in which a stored road image is superimposed on a captured image of a road in front of the vehicle 200 that the vehicle 200 sends to the image management server 100 after capturing the image while the vehicle 200 is travelling. The image management server 100 sends the superimposed image to the vehicle 200. The image management server 100 may be an exemplary image processing apparatus. A driver of the vehicle 200 sends a superimposition request from the vehicle 200 to the image management server 100 for example while the vehicle 200 is travelling on a road such as a snow-covered road where white lines are not visually recognizable. After sending the superimposition request, the vehicle 200 sends, to the image management server 100, vehicle image information including a road image of a road, road images of which are being captured, and an image-capturing position.

The image management server 100 reads out a road image corresponding to an image-capturing position included in the vehicle image information, generates a superimposed image in which the road image is superimposed on the captured image included in the vehicle image information, and sends the superimposed image to the vehicle 200. Thereby, a superimposed image in which a road image on which white lines are visually recognizable is superimposed on an image of a snow-covered road on which the vehicle 200 is travelling can be provided to the driver of the vehicle 200, and it becomes possible to allow the driver to drive while being aware of the white line positions.

The image management server 100 may further manage vehicle information about each of a plurality of vehicles 200. Vehicle information may include the position of a vehicle 200. Vehicle information may include the advancing direction and travelling speed of a vehicle 200. Vehicle information may include route information indicating a route to a destination of a vehicle 200. The image management server 100 may receive various types of vehicle information regularly from a vehicle 200 via the network 20.

If the image management server 100 received a superimposition request from the vehicle 200, the image management server 100 may request vehicle image information from a vehicle ahead 202 travelling in front of the vehicle 200, and receive the vehicle image information from the vehicle ahead 202. The vehicle ahead 202 may have a configuration similar to the configuration of the vehicle 200.

The image management server 100 reads out a road image corresponding to an image-capturing position included in the vehicle image information received from the vehicle ahead 202, generates a superimposed image in which the road image is superimposed on the captured image included in the vehicle image information, and sends the superimposed image to the vehicle 200. Thereby, it becomes possible to allow the driver of the vehicle 200 to be aware of the white line positions of a road ahead. In addition, in possible situations where sending of a captured image and generation of a superimposed image inevitably take a relatively long time, and a time lag which is not negligible happens inevitably if a superimposed image is sent to the vehicle 200 after superimposing a road image on the captured image received from the vehicle 200, the time lag can be made short or eliminated by sending, to the vehicle 200, a superimposed image in which a road image is superimposed on a captured image captured by the vehicle ahead 202.

Figure 2:
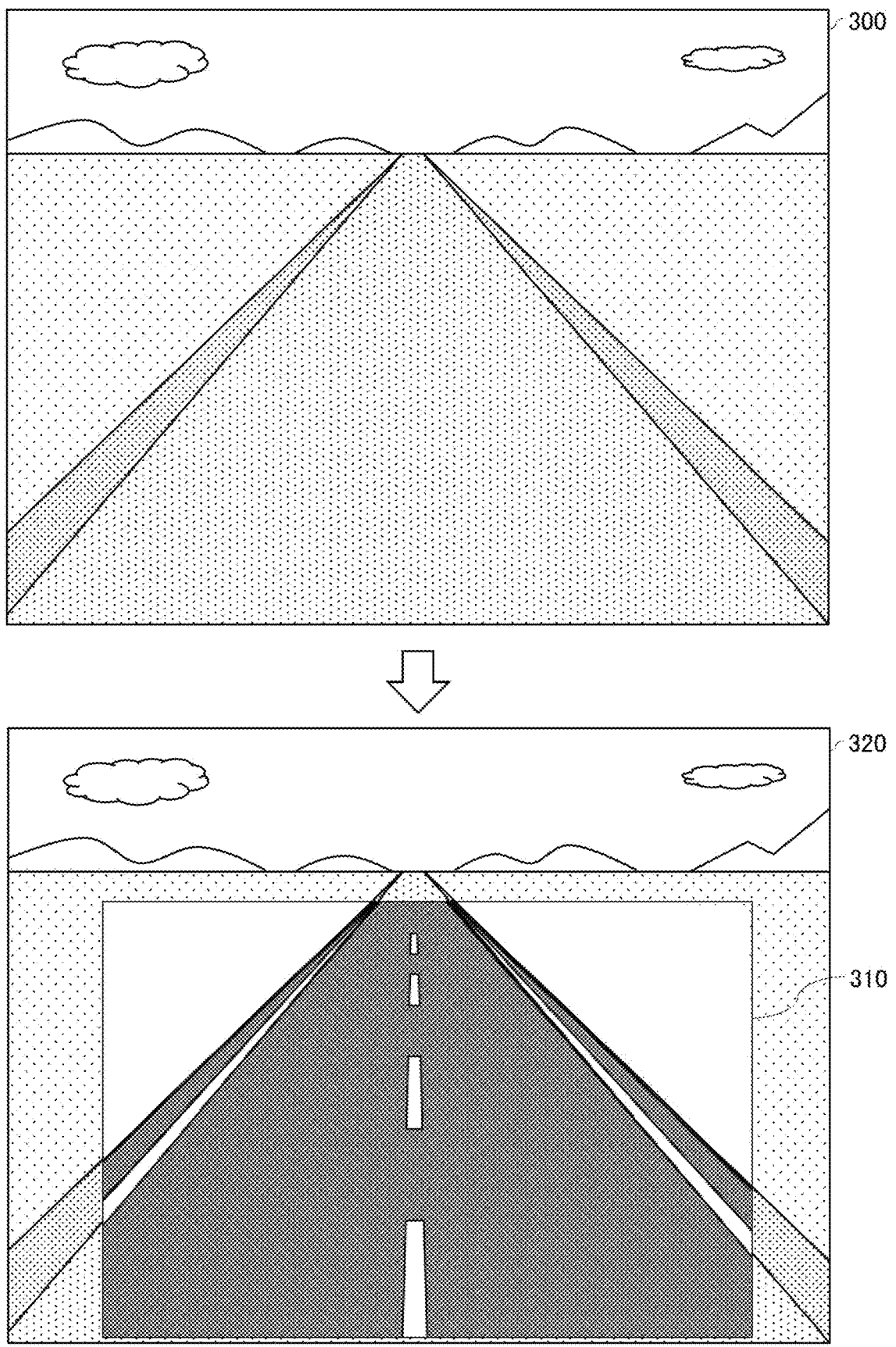
FIG. 2 schematically illustrates an exemplary superimposed image 320 generated by the image management server 100.

FIG. 2 schematically illustrates an exemplary superimposed image 320 generated by the image management server 100. A captured image 300 illustrated in FIG. 2 illustrates a situation where white lines of a road are hidden due to snow cover, and are not visually recognizable. In a situation like the one shown in the captured image 300, a driver has no way but to drive a vehicle while guessing white line positions relying on his/her experience or intuition, and this is burdensome for the driver.

In contrast, by presenting to the driver the superimposed image 320 in which a road image 310 is superimposed, it becomes possible to allow the driver to be aware that white lines are actually present, and to be aware of the white line positions, thereby reducing burden for the driver.

The image management server 100 may generate one superimposed image 320 which is a still image for one captured image 300 which is a still image, and send the superimposed image 320 to the vehicle 200. Simply sending one superimposed image 320 which is a still image can make it possible to allow a driver of the vehicle 200 to be aware of the presence of white lines, and the approximate positions of the white lines. The image management server 100 may generate a plurality of superimposed images 320 for captured images 300 which are a plurality of successively captured still images, and send the plurality of superimposed images 320 to the vehicle 200. The image management server 100 may generate a superimposed image 320 which is a moving image for a captured image 300 which is a moving image, and send the superimposed image 320 to the vehicle 200.

Figure 3:
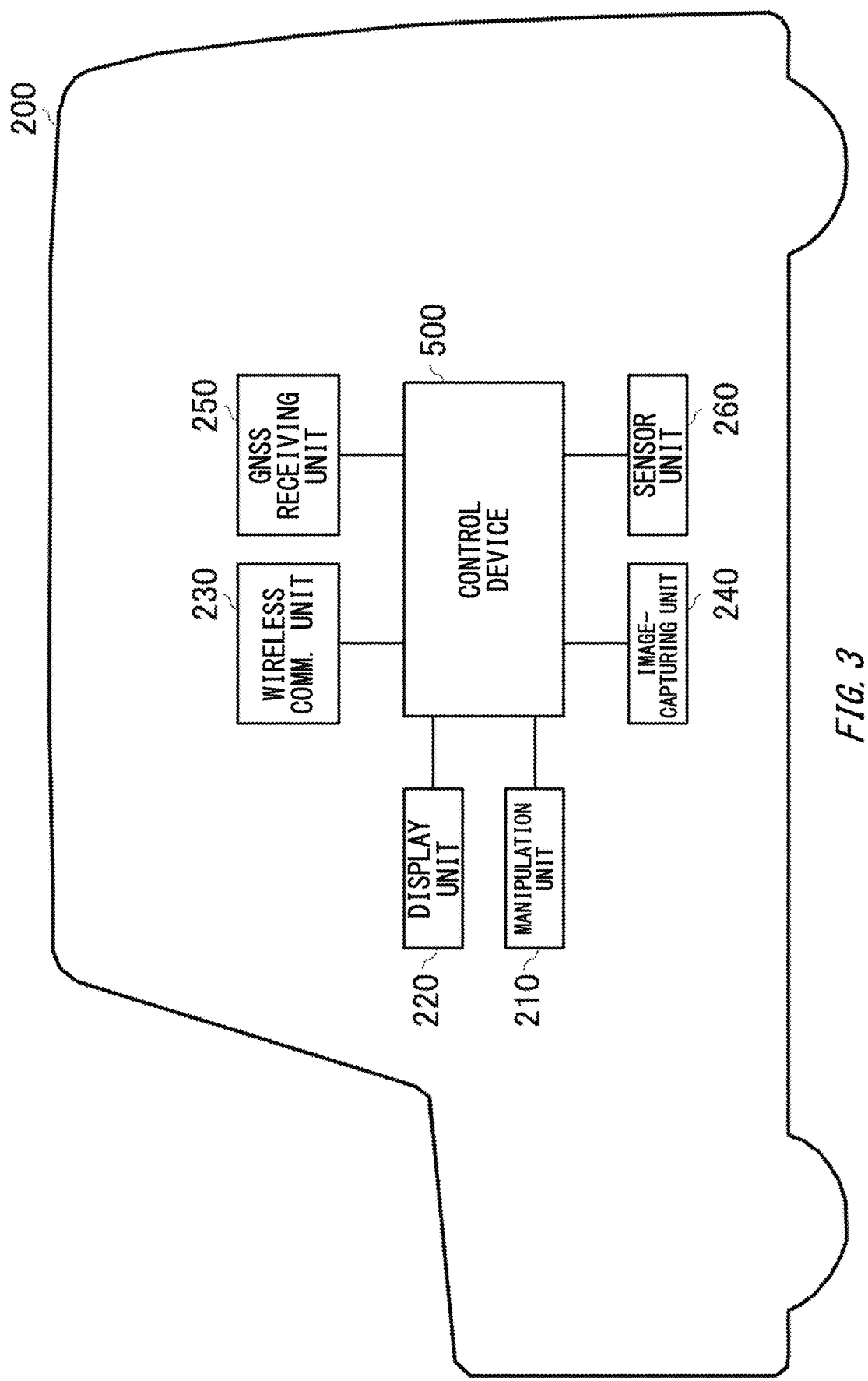
FIG. 3 schematically illustrates an exemplary configuration of a vehicle 200.

FIG. 3 schematically illustrates an exemplary configuration of the vehicle 200. The vehicle 200 includes a manipulation unit 210, a display unit 220, a wireless communication unit 230, an image-capturing unit 240, a GNSS (Global Navigation Satellite System) receiving unit 250, a sensor unit 260, and a control device 500. At least some of these configurations may be configurations included in a so-called car navigation system.

The manipulation unit 210 undergoes manipulation by a user of the vehicle 200. The manipulation unit 210 may include physical manipulation buttons, and the like. The manipulation unit 210 and display unit 220 may be a touch panel display. The manipulation unit 210 may undergo audio manipulation. The manipulation unit 210 may include a microphone, and a speaker.

The wireless communication unit 230 communicates with the image management server 100 via the network 20. The wireless communication unit 230 may include a communication unit that communicates with the network 20 via radio base stations in a mobile phone network. In addition, the wireless communication unit 230 may include a communication unit that communicates with the network 20 via WiFi (registered trademark) access points. In addition, the wireless communication unit 230 may include a communication unit that executes vehicle-to-infrastructure communication.

The wireless communication unit 230 may execute wireless communication with another vehicle 200. The wireless communication unit 230 may include a communication unit that executes vehicle-to-vehicle communication.

The image-capturing unit 240 includes one or more cameras. The camera may be a drive recorder. If the image-capturing unit 240 includes a plurality of cameras, the plurality of cameras are placed at different positions in the vehicle 200. In addition, the plurality of cameras capture images in different image-capturing directions. At least one of the plurality of cameras captures an image of the space in front of the vehicle 200.

The GNSS receiving unit 250 receives radio waves emitted from a GNSS satellite. The GNSS receiving unit 250 may identify the position of the vehicle 200 based on signals received from the GNSS satellite.

The sensor unit 260 includes one or more sensors. The sensor unit 260 includes an acceleration sensor, for example. The sensor unit 260 includes an angular velocity sensor (gyro sensor), for example. The sensor unit 260 includes a geomagnetic sensor, for example. The sensor unit 260 includes a vehicle speed sensor, for example.

The control device 500 controls the manipulation unit 210, display unit 220, wireless communication unit 230, image-capturing unit 240, GNSS receiving unit 250, and sensor unit 260, and executes various types of processing. The control device 500 executes a navigation process, for example. The control device 500 may execute a navigation process similar to a navigation process executed by known car navigation systems.

For example, the control device 500 identifies the current position of the vehicle 200 based on output from the GNSS receiving unit 250, and sensor unit 260, reads out map data corresponding to the current position, and makes the display unit 220 display the map data. In addition, a destination is input to the control device 500 via the manipulation unit 210, and the control device 500 identifies recommended routes from the current position of the vehicle 200 to the destination, and makes the display unit 220 display the recommended routes. If the control device 500 received an indication of selection of a route, the control device 500 gives directions about a course along which the vehicle 200 should travel, via the display unit 220 and a speaker according to the selected route.

In addition, the control device 500 executes a process of sending, to the image management server 100, a road image captured by the image-capturing unit 240. The control device 500 sends, to the image management server 100, the road image captured by the image-capturing unit 240 in association with an image-capturing position and an image-capturing time. Communication between the control device 500 and the outside of the image management server 100 is performed via the wireless communication unit 230. The control device 500 may send road images to the image management server 100 regularly. In addition, upon being requested by the image management server 100, the control device 500 may send a road image to the image management server 100.

The control device 500 according to the present embodiment executes a superimposition requesting process of requesting superimposition of a road image stored in the image management server 100 on a captured image being captured by the image-capturing unit 240. Upon being instructed by a driver, for example, the control device 500 sends the superimposition request to the image management server 100. Then, upon receiving a response from the image management server 100 indicating an approval by the image management server 100, sending of vehicle image information including a captured image captured by the image-capturing unit 240 and an image-capturing position to the image management server 100 is started. The control device 500 may send vehicle image information to the image management server 100 successively.

Then, the control device 500 executes a display process of displaying a superimposed image received from the image management server 100. The control device 500 may display a superimposed image received from the image management server 100 on the display unit 220.

Figure 4:
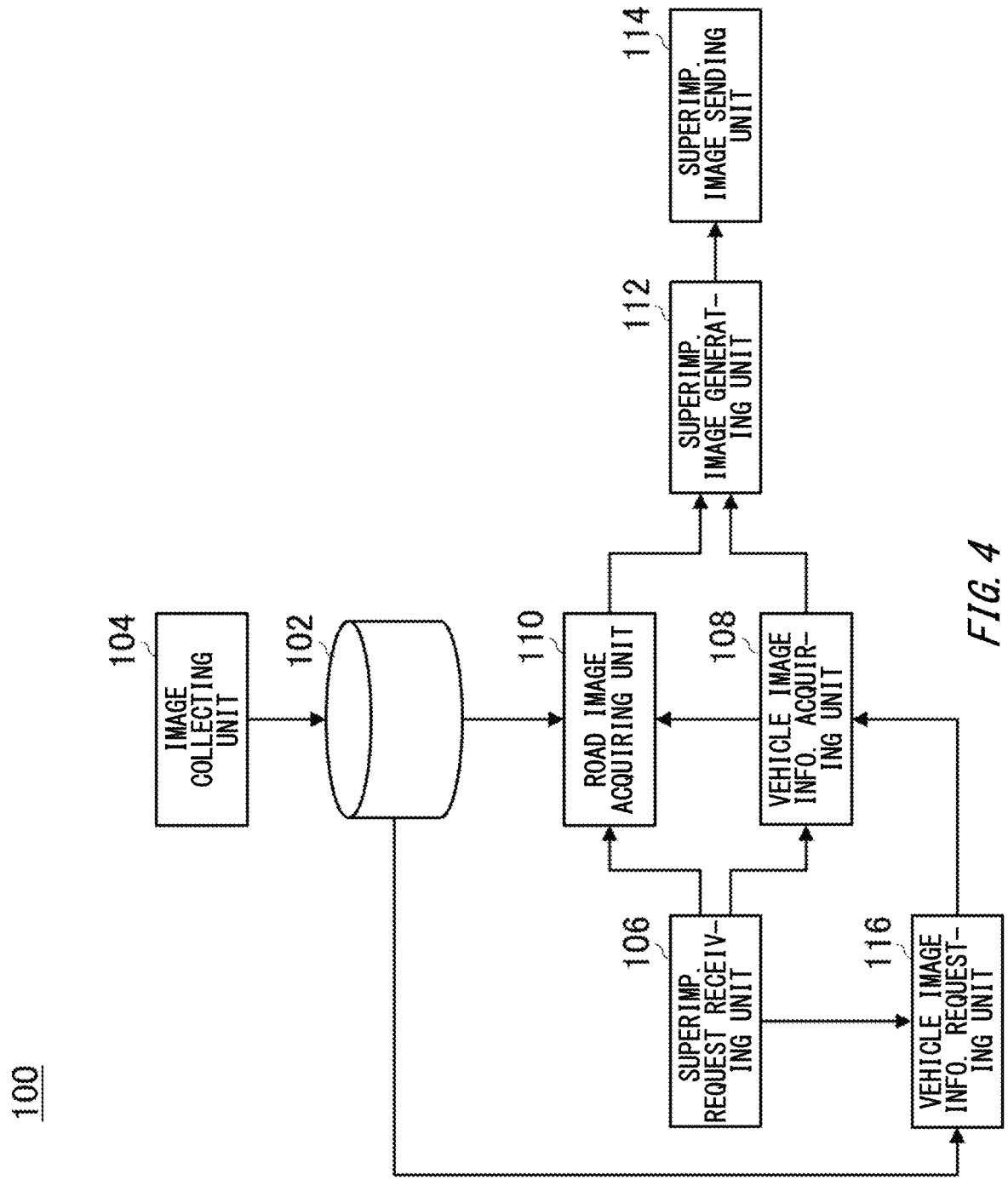
FIG. 4 schematically illustrates an exemplary functional configuration of the image management server 100.

FIG. 4 schematically illustrates an exemplary functional configuration of the image management server 100. The image management server 100 includes a storage unit 102, an image collecting unit 104, a superimposition request receiving unit 106, a vehicle image information acquiring unit 108, a road image acquiring unit 110, a superimposed image generating unit 112, a superimposed image sending unit 114, and a vehicle image information requesting unit 116. Note that the image management server 100 is not necessarily required to include all of these configurations.

The storage unit 102 stores various types of information. The storage unit 102 stores a road image, and an image-capturing position and image-capturing time, in association with each other. The storage unit 102 may store vehicle information about a plurality of vehicles 200.

The image collecting unit 104 collects road images. The image collecting unit 104 receives road images, image-capturing positions, and image-capturing times sent by a vehicle 200 via the network 20, and stores them in the storage unit 102. The image collecting unit 104 may receive road images, image-capturing positions, and image-capturing times sent by a vehicle 200 regularly, and store them in the storage unit 102. In addition, the image collecting unit 104 may send a request to a vehicle 200, and make the vehicle 200 send a road image, an image-capturing position, and an image-capturing time. For example, if a road image of a road is not stored or a stored road image of a road is old, the image collecting unit 104 sends, to a vehicle 200, a request including the position of the road, and receives a road image, an image-capturing position, and an image-capturing time from the vehicle 200 that captured an image of the road at the position.

The superimposition request receiving unit 106 receives a superimposition request. The superimposition request receiving unit 106 receives a superimposition request from a vehicle 200 via the network 20. In response to a superimposition request, the superimposition request receiving unit 106 may send a response indicating an approval to a vehicle 200 that sent the superimposition request.

The vehicle image information acquiring unit 108 receives vehicle image information from a vehicle 200. The road image acquiring unit 110 acquires, from the storage unit 102, a road image corresponding to an image-capturing position included in vehicle image information received by the vehicle image information acquiring unit 108.

The superimposed image generating unit 112 generates a superimposed image in which a road image acquired by the road image acquiring unit 110 is superimposed on a captured image included in vehicle image information received by the vehicle image information acquiring unit 108. The superimposed image generating unit 112 may increase or reduce the size of a road image or trim a partial region of a road image, and superimpose the thus-obtained image on a captured image. The superimposed image sending unit 114 sends, to a vehicle 200, a superimposed image generated by the superimposed image generating unit 112.

The vehicle image information requesting unit 116 requests vehicle image information. If the superimposition request receiving unit 106 received a superimposition request from a vehicle 200, for example, the vehicle image information requesting unit 116 requests vehicle image information from a vehicle ahead 202 travelling in front of the vehicle 200. The vehicle image information requesting unit 116 may refer to vehicle information about a plurality of vehicles 200 stored in the storage unit 102, and identify a vehicle ahead 202 travelling in front of the vehicle 200 that sent the superimposition request. The vehicle image information acquiring unit 108 may receive vehicle image information sent by a vehicle ahead 202 in response to a request from the vehicle image information requesting unit 116.

Figure 5:
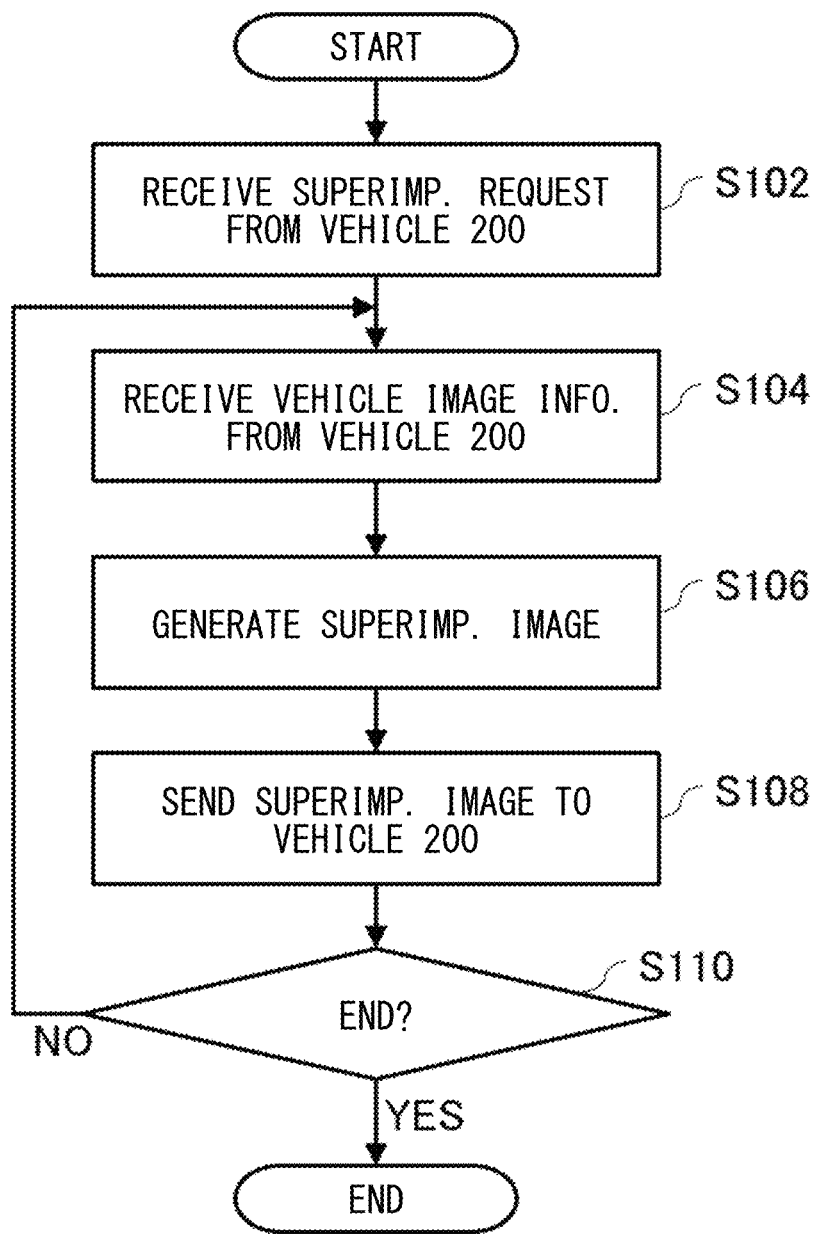
FIG. 5 schematically illustrates an exemplary flow of process to be performed by the image management server 100.

FIG. 5 schematically illustrates an exemplary flow of process to be performed by the image management server 100. In an exemplary process illustrated here, a superimposition request is received from a vehicle 200, and a superimposed image is sent to the vehicle 200. Each process illustrated in FIG. 5 may be executed under the control of a control unit provided to the image management server 100.

At Step (steps are abbreviated to S's in some cases) 102, the superimposition request receiving unit 106 receives a superimposition request from a vehicle 200. At S104, the vehicle image information acquiring unit 108 receives vehicle image information from the vehicle 200. The road image acquiring unit 110 acquires, from the storage unit 102, a road image corresponding to an image-capturing position included in the vehicle image information.

At S106, the superimposed image generating unit 112 generates a superimposed image. At S108, the superimposed image sending unit 114 sends the superimposed image to the vehicle 200. At S110, it is determined whether or not to end the process. The image management server 100 determines to end the process if it received an instruction to end the process from the vehicle 200, for example. If it is determined not to end the process, the process returns to S106, and if it is determined to end the process, the process is ended.

Figure 6:
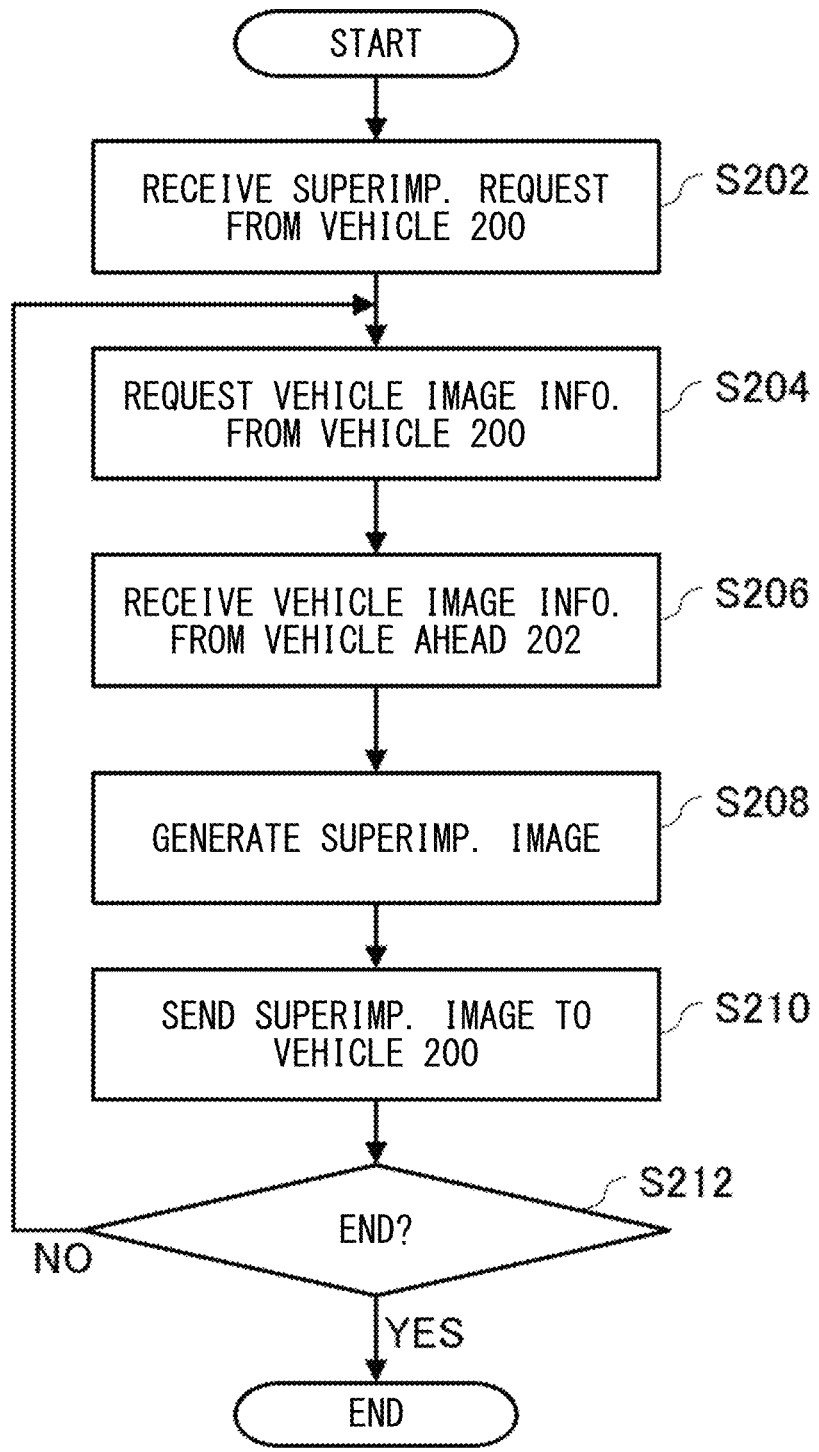
FIG. 6 schematically illustrates an exemplary flow of process to be performed by the image management server 100.

FIG. 6 schematically illustrates an exemplary flow of process to be performed by the image management server 100. In another exemplary process illustrated here, a superimposition request is received from a vehicle 200, and a superimposed image is sent to the vehicle 200. Each process illustrated in FIG. 6 may be executed under the control of a control unit provided to the image management server 100.

At S202, the superimposition request receiving unit 106 receives a superimposition request from a vehicle 200. At S204, the vehicle image information requesting unit 116 requests vehicle image information from a vehicle ahead 202 travelling in front of the vehicle 200.

At S206, the vehicle image information acquiring unit 108 receives vehicle image information from the vehicle ahead 202. The road image acquiring unit 110 acquires a road image corresponding to an image-capturing position included in the vehicle image information.

At S208, the superimposed image generating unit 112 generates a superimposed image. At S210, the superimposed image sending unit 114 sends the superimposed image to the vehicle 200. At S212, it is determined whether or not to end the process. The image management server 100 determines to end the process if it received an instruction to end the process from the vehicle 200, for example. If it is determined not to end the process, the process returns to S204, and if it is determined to end the process, the process is ended. Note that, after request information is sent to the vehicle ahead 202, sending of the vehicle image information by the vehicle ahead 202 may be continued until the vehicle ahead 202 is instructed to stop the sending. In that case, if it is determined at S212 not to end the process, the process returns to S206.

Although in the above-described embodiment explained, the image management server 100 performs generation of superimposed images, this is not the sole example, and the control device 500 of the vehicle 200 may generate superimposed images. The control device 500 may be an exemplary image processing apparatus.

Figure 7:
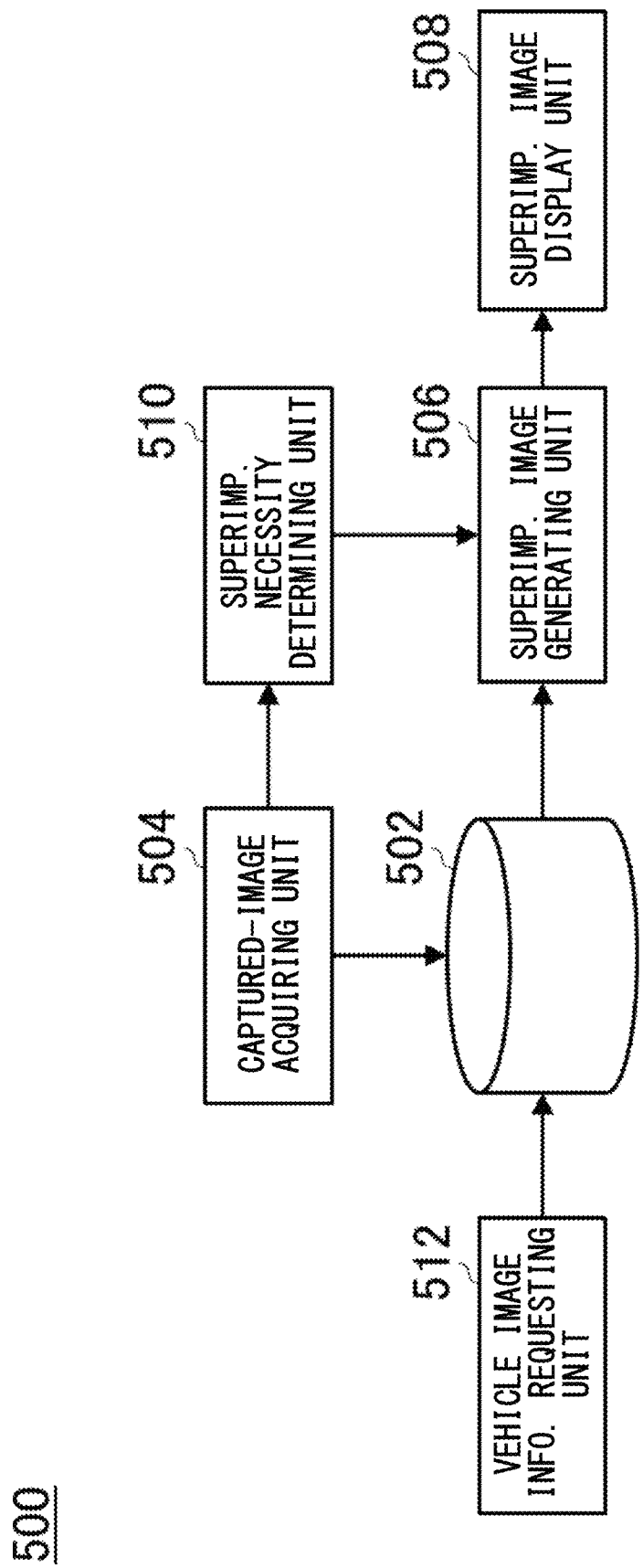
FIG. 7 schematically illustrates an exemplary functional configuration of a control device 500.

FIG. 7 schematically illustrates an exemplary functional configuration of the control device 500. The control device 500 includes a storage unit 502, a captured-image acquiring unit 504, a superimposed image generating unit 506, a superimposed image display unit 508, a superimposition necessity determining unit 510, and a vehicle image information requesting unit 512. Note that the control device 500 is not necessarily required to include all of these configurations.

The storage unit 502 stores various types of information. The storage unit 502 stores road images captured by a plurality of vehicles 200, and image-capturing positions and image-capturing times, in association with each other. The storage unit 502 may receive them from the image management server 100, and store them, for example. In addition, the storage unit 502 stores road map data including white line information indicating the presence or absence of white lines in each of a plurality of roads. The storage unit 502 may be an exemplary map data storage unit.

The captured-image acquiring unit 504 acquires a captured image captured by the image-capturing unit 240. The captured-image acquiring unit 504 may store, in the storage unit 502, the acquired captured image, and an image-capturing position in association with each other.

The superimposed image generating unit 506 generates a superimposed image in which a road image stored in the storage unit 502 is superimposed on a captured image acquired by the captured-image acquiring unit 504 and stored in the storage unit 102. The superimposed image generating unit 506 may read out a captured image, and a road image corresponding to the image-capturing position of the captured image from the storage unit 102, and generate a superimposed image.

The superimposed image display unit 508 causes the superimposed image generated by the superimposed image generating unit 506 to be displayed. The superimposed image display unit 508 makes the display unit 220 display the superimposed image, for example. In addition, the superimposed image display unit 508 may send the superimposed image to a communication terminal selected in advance, and make the communication terminal display the superimposed image. Examples of such a communication terminal include a mobile phone such as a smart phone or a tablet terminal that is owned by a user of a vehicle 200, and the like.

Based on a captured image acquired by the captured-image acquiring unit 504, its image-capturing position, and road map data stored in the storage unit 102, the superimposition necessity determining unit 510 determines whether or not to superimpose a road image on the captured image. For example, if the road map data indicates that a road at the image-capturing position includes white lines, and the white lines cannot be recognized in the captured image, the superimposition necessity determining unit 510 determines to superimpose the captured image on the road image. If the superimposition necessity determining unit 510 determined to superimpose the road image on the captured image, the superimposed image generating unit 506 may generate a superimposed image in which the road image is superimposed on the captured image.

The vehicle image information requesting unit 512 requests vehicle image information from another vehicle 200. The vehicle image information requesting unit 512 requests vehicle image information from a vehicle ahead 202 travelling in front of a vehicle 200 on which the control device 500 is mounted, for example. The vehicle image information requesting unit 512 may request vehicle image information from a vehicle ahead 202 via vehicle-to-vehicle communication. The vehicle image information requesting unit 512 may receive vehicle image information sent by the vehicle ahead 202 in response to the request, and store the vehicle image information in the storage unit 502. In this case, the superimposed image generating unit 506 may generate a superimposed image in which a road image stored in the storage unit 502 is superimposed on a captured image included in the vehicle image information received from the vehicle ahead 202.

Figure 8:
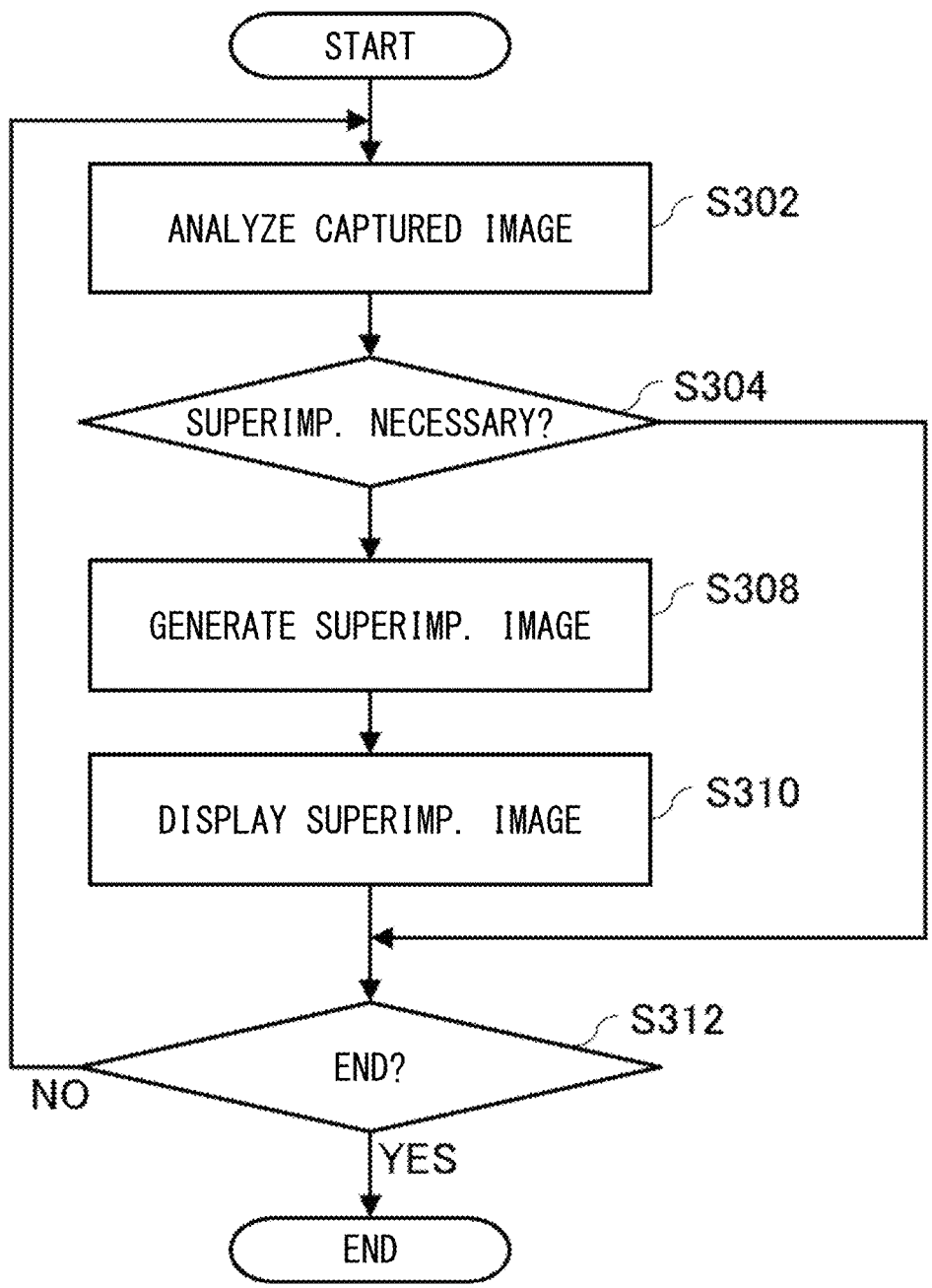
FIG. 8 schematically illustrates an exemplary flow of process to be performed by the control device 500.

FIG. 8 schematically illustrates an exemplary flow of process to be performed by the control device 500. In the flow of process to be performed by the control device 500 illustrated here, the superimposition necessity determining unit 510 determines whether or not to superimpose a road image on a captured image. Each process illustrated in FIG. 8 is executed under the control of a control unit provided to the control device 500.

At S302, the superimposition necessity determining unit 510 analyzes a captured image acquired by the captured-image acquiring unit 504. At S304, depending on a result of the analysis, the superimposition necessity determining unit 510 determines whether or not to superimpose a road image on the captured image. If it is determined to superimpose the images, the process proceeds to S306, and if it is determined not to superimpose the images, the process proceeds to S312.

At S306, the superimposed image generating unit 506 generates a superimposed image. The superimposed image generating unit 506 generates a superimposed image. In the superimposed image, a road image corresponding to the image-capturing position of a captured image on which the road image is determined to be superimposed is superimposed on the captured image. At S308, the superimposed image display unit 508 causes the superimposed image generated at S306 to be displayed. At S310, it is determined whether or not to end the process. The image management server 100 determines to end the process if it received an instruction to end the process from the vehicle 200, for example. If it is determined not to end the process, the process returns to S302, and if it is determined to end the process, the process is ended.

Figure 9:
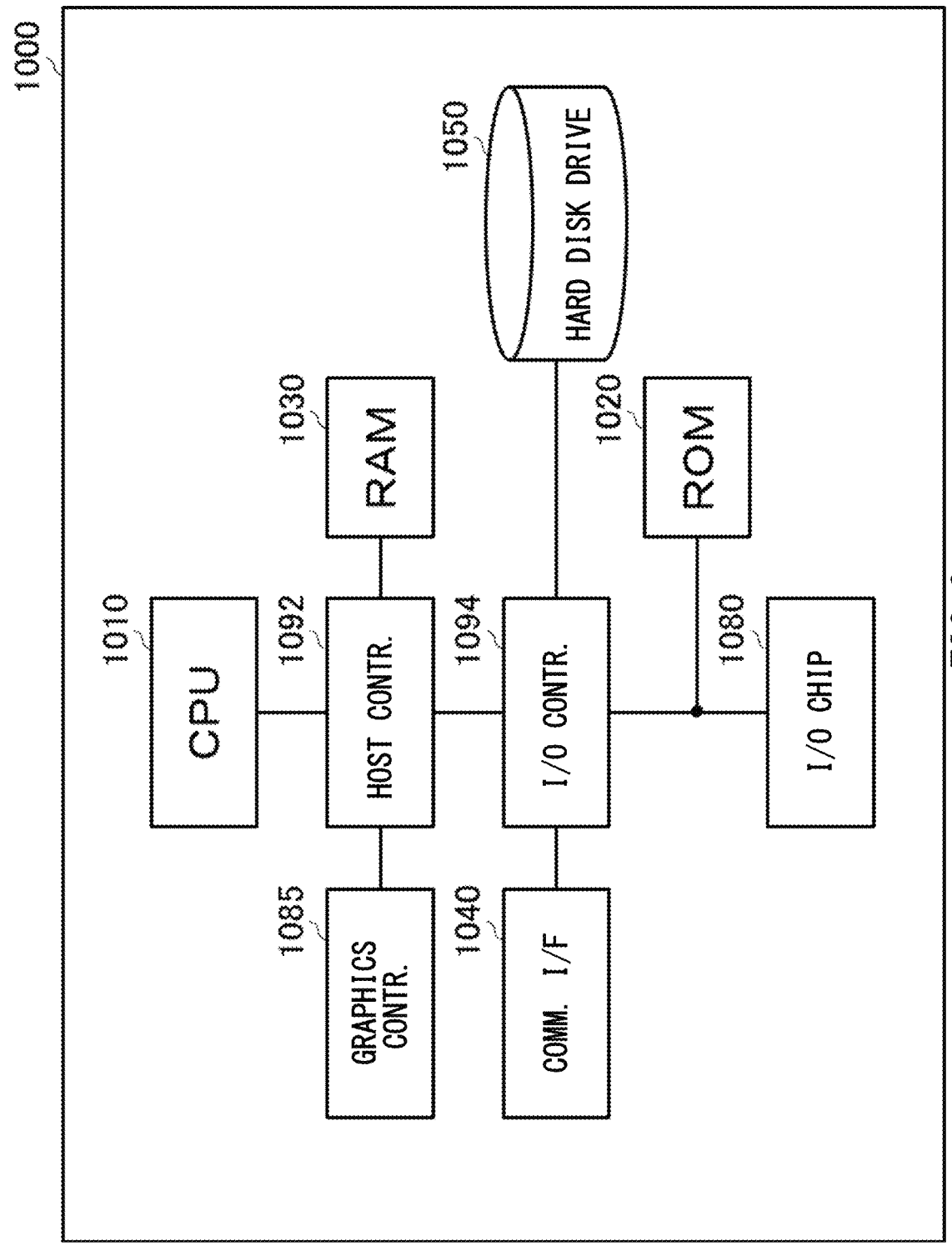
FIG. 9 schematically illustrates an exemplary hardware configuration of a computer 1000 to function as the image management server 100 or the control device 500.

FIG. 9 schematically illustrates an exemplary hardware configuration of a computer 1000 to function as the image management server 100 or the control device 500. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored in the ROM 1020 and RAM 1030, and performs control of each unit. The graphics controller 1085 acquires image data generated by the CPU 1010 or the like on a frame buffer provided in the RAM 1030, and makes a display display the image data. Instead, the graphics controller 1085 may include therein a frame buffer to store image data generated by the CPU 1010 or the like.

The communication I/F 1040 communicates with another device via a network. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation, and programs or the like that depend on hardware of the computer 1000. The input/output chip 1080 connects various types of input/output devices to the input/output controller 1094 via, for example, a parallel port, a serial port, a keyboard port, a mouse port, and the like.

Programs to be provided to the hard disk drive 1050 via the RAM 1030 are provided by a user in the form stored in a recording medium such as an IC card. The programs are read out from the recording medium, installed in the hard disk drive 1050 via the RAM 1030, and executed at the CPU 1010.

The programs that are installed in the computer 1000, and make the computer 1000 function as the image management server 100 or the control device 500 may act on the CPU 1010 or the like, and each of the programs may make the computer 1000 function as a unit(s) of the image management server 100 or the control device 500. Information processing described in these programs are read in by the computer 1000 to thereby function as the storage unit 102, image collecting unit 104, superimposition request receiving unit 106, vehicle image information acquiring unit 108, road image acquiring unit 110, superimposed image generating unit 112, superimposed image sending unit 114, and vehicle image information requesting unit 116, which are specific means attained by cooperation between software and various types of hardware resources mentioned above. In addition, information processing described in these programs are read in by the computer 1000 to thereby function as the storage unit 502, captured-image acquiring unit 504, superimposed image generating unit 506, superimposed image display unit 508, superimposition necessity determining unit 510, and vehicle image information requesting unit 512, which are specific means attained by cooperation between software and various types of hardware resources mentioned above. Then, with these specific means, operations on or processing of information corresponding to an intended use of the computer 1000 in the present embodiment are realized to thereby construct the image management server 100 or control device 500 corresponding to the intended use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

20: network; 100: image management server; 102: storage unit; 104: image collecting unit; 106: superimposition request receiving unit; 108: vehicle image information acquiring unit; 110: road image acquiring unit; 112: superimposed image generating unit; 114: superimposed image sending unit; 116: vehicle image information requesting unit; 200: vehicle; 202: vehicle ahead; 210: manipulation unit; 220: display unit; 230: wireless communication unit; 240: image-capturing unit; 250: GNSS receiving unit; 260: sensor unit; 300: captured image; 310: road image; 320: superimposed image; 500: control device; 502: storage unit; 504: captured-image acquiring unit; 506: superimposed image generating unit; 508: superimposed image display unit; 510: superimposition necessity determining unit; 512: vehicle image information requesting unit; 1000: computer; 1010: CPU; 1020: ROM; 1030: RAM; 1040: communication I/F; 1050: hard disk drive; 1080: input/output chip; 1085: graphics controller; 1092: host controller; 1094: input/output controller

What is claimed is:

1. An image processing apparatus comprising:
   a vehicle image information acquiring unit that acquires vehicle image information including at least one captured image captured by a vehicle, and an image-capturing position of the captured image;
   a road image acquiring unit that acquires at least one road image corresponding to the image-capturing position from a plurality of road images captured by a vehicle; and
   a superimposed image generating unit that generates a superimposed image in which the road image is superimposed on the captured image, wherein
   the vehicle image information acquiring unit acquires first vehicle image information including a first captured image captured by a first vehicle and an image-capturing position of the first captured image, the image processing apparatus comprises:
a map data storage unit that stores road map data including boundary line information indicating presence or absence of a boundary line in each of a plurality of roads; and
a superimposition necessity determining unit that determines whether or not to superimpose the road image on the first captured image based on the first vehicle image information and the road map data, and
the superimposed image generating unit generates a first superimposed image in which the road image is superimposed on the first captured image if the superimposition necessity determining unit determines to superimpose the road image on the first captured image.

2. The image processing apparatus according to claim 1, wherein
the image processing apparatus comprises a superimposed image sending unit that sends, to the first vehicle, the first superimposed image generated by the superimposed image generating unit.

3. The image processing apparatus according to claim 1, wherein
the image processing apparatus comprises a superimposed image sending unit that sends, to a second vehicle, the first superimposed image generated by the superimposed image generating unit.

4. The image processing apparatus according to claim 3, wherein the superimposed image sending unit sends the first superimposed image to the second vehicle travelling behind the first vehicle.

5. The image processing apparatus according to claim 1, wherein the boundary line is a white line.

6. The image processing apparatus according to claim 1, wherein the superimposition necessity determining unit determines to superimpose the road image on the first captured image if the road map data indicates that a road at the image-capturing position of the first captured image included in the first vehicle image information includes a boundary line, and a boundary line cannot be recognized in the first captured image.

7. The image processing apparatus according to claim 6, wherein the boundary line is a white line.

8. The image processing apparatus according to claim 1, comprising:
an image collecting unit that collects the road image; and
a storage unit that stores the road image collected by the image collecting unit, wherein
the road image acquiring unit acquires a road image corresponding to the image-capturing position from the plurality of road images stored in the storage unit.

9. The image processing apparatus according to claim 8, wherein, if a road image of a road is not stored, the image collecting unit sends, to a vehicle, a request including a position of the road, and receives a road image, and an image-capturing position and an image-capturing time from the vehicle that has captured an image of the road at the position.

10. The image processing apparatus according to claim 8, wherein, if a stored road image of a road is old, the image collecting unit sends, to a vehicle, a request including a position of the road, and receives a road image, and an image-capturing position and an image-capturing time from the vehicle that has captured an image of the road at the position.

11. The image processing apparatus according to claim 1, wherein
the captured image and the road image are still images, and
the superimposed image generating unit generates a superimposed image which is a still image in which the road image is superimposed on the captured image.

12. The image processing apparatus according to claim 1, wherein
the at least one captured image includes a plurality of still captured images that are successively captured,
the at least one road image includes a plurality of still road images, and
the superimposed image generating unit generates superimposed images which are a plurality of still images, each superimposed image being an image in which one of the plurality of still road images is superimposed on one of the plurality of still captured images.

13. The image processing apparatus according to claim 1, wherein
the captured image and the road image are moving images, and
the superimposed image generating unit generates a superimposed image which is a moving image in which the road image is superimposed on the captured image.

14. The image processing apparatus according to claim 1, wherein
a viewpoint of the road image is substantially the same as a viewpoint of the captured image.

15. The image processing apparatus according to claim 1, wherein
the road image acquiring unit acquires the at least one road image that is captured when it is not raining nor snowing.

16. The image processing apparatus according to claim 1, wherein
the road image acquiring unit acquires the at least one road image that is captured when there is an unobstructed view of a road.

17. A non-transitory computer-readable storage medium having stored thereon a program for causing a computer to function as:
a vehicle image information acquiring unit that acquires vehicle image information including a captured image captured by a vehicle, and an image-capturing position of the captured image;
a road image acquiring unit that acquires a road image corresponding to the image-capturing position from a plurality of road images captured by a vehicle; and
a superimposed image generating unit that generates a superimposed image in which the road image is superimposed on the captured image, wherein
the vehicle image information acquiring unit acquires first vehicle image information including a first captured image captured by a first vehicle and an image-capturing position of the first captured image,
the computer functions as:
a map data storage unit that stores road map data including boundary line information indicating presence or absence of a boundary line in each of a plurality of roads; and
a superimposition necessity determining unit that determines whether or not to superimpose the road image on the first captured image based on the first vehicle image information and the road map data, and
the superimposed image generating unit generates a first superimposed image in which the road image is superimposed on the first captured image if the superimposition necessity determining unit determines to superimpose the road image on the first captured image.

\* \* \* \* \*